United States Patent [19]
Green et al.

[11] Patent Number: 5,837,949
[45] Date of Patent: Nov. 17, 1998

[54] CIRCUIT BREAKER DRAW APPARATUS AND SYSTEM WITH A SLIDER FLANGE ATTACHED TO THE ACTIVE DRAW BRACKET

[75] Inventors: Russell B. Green, Douglasville; Pavel N. Lichtman, Roswell; W. Dale Robbins, Lithonia, all of Ga.

[73] Assignee: Siemens Energy & Automation, Inc., Alpharetta, Ga.

[21] Appl. No.: 673,658

[22] Filed: Jun. 28, 1996

[51] Int. Cl.⁶ .............................. H01H 9/22; H01H 9/00
[52] U.S. Cl. ...................... 200/50.21; 200/50.27
[58] Field of Search .................. 200/50.21, 50.22, 200/50.23, 50.24, 50.25, 50.26, 50.27; 361/605, 606, 607, 608, 609; 74/503, 525

[56] References Cited

U.S. PATENT DOCUMENTS

| | | | |
|---|---|---|---|
| 3,681,545 | 8/1972 | Cellerini et al. | 200/50 AA |
| 4,139,748 | 2/1979 | Wolfe et al. | 200/50 AA |
| 5,097,382 | 3/1992 | Leach et al. | 361/345 |
| 5,200,585 | 4/1993 | Davies et al. | 200/50 AA |

Primary Examiner—Cassandra C. Spyrou
Assistant Examiner—Michael J. Hayes

[57] ABSTRACT

A circuit breaker draw apparatus, means and system for use with a circuit breaker assembly, where the circuit breaker assembly has a circuit breaker unit that is adapted for connection to or disconnection from a circuit breaker connecting apparatus. The circuit breaker movement apparatus, means and system includes a movement bracket assembly adapted for mounting to the circuit breaker connecting apparatus, a guide assembly adapted for mounting to the circuit breaker unit, and a drive assembly adapted for mounting to the bracket assembly and for causing the guide assembly to move with respect to the bracket assembly.

28 Claims, 9 Drawing Sheets

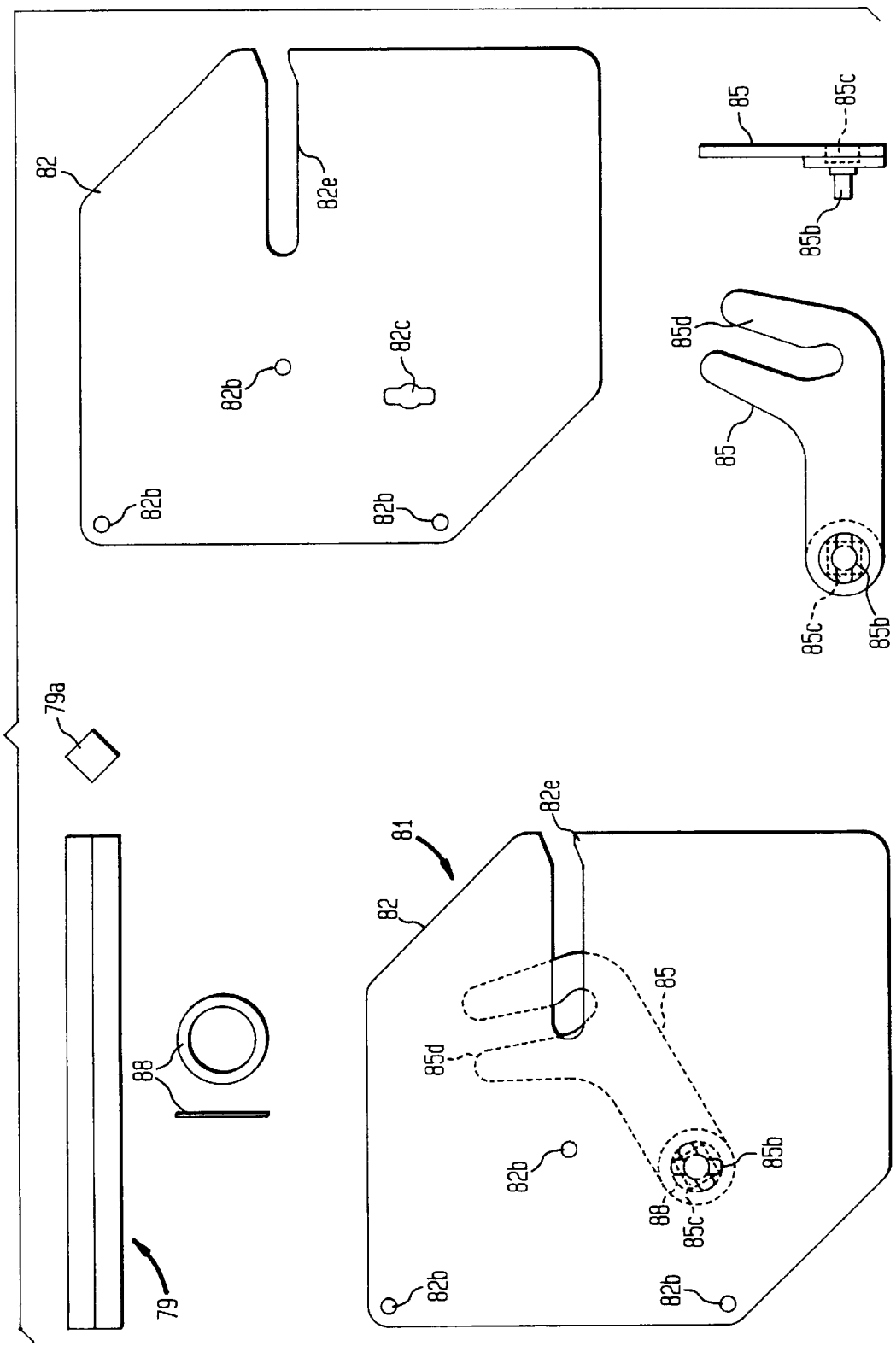

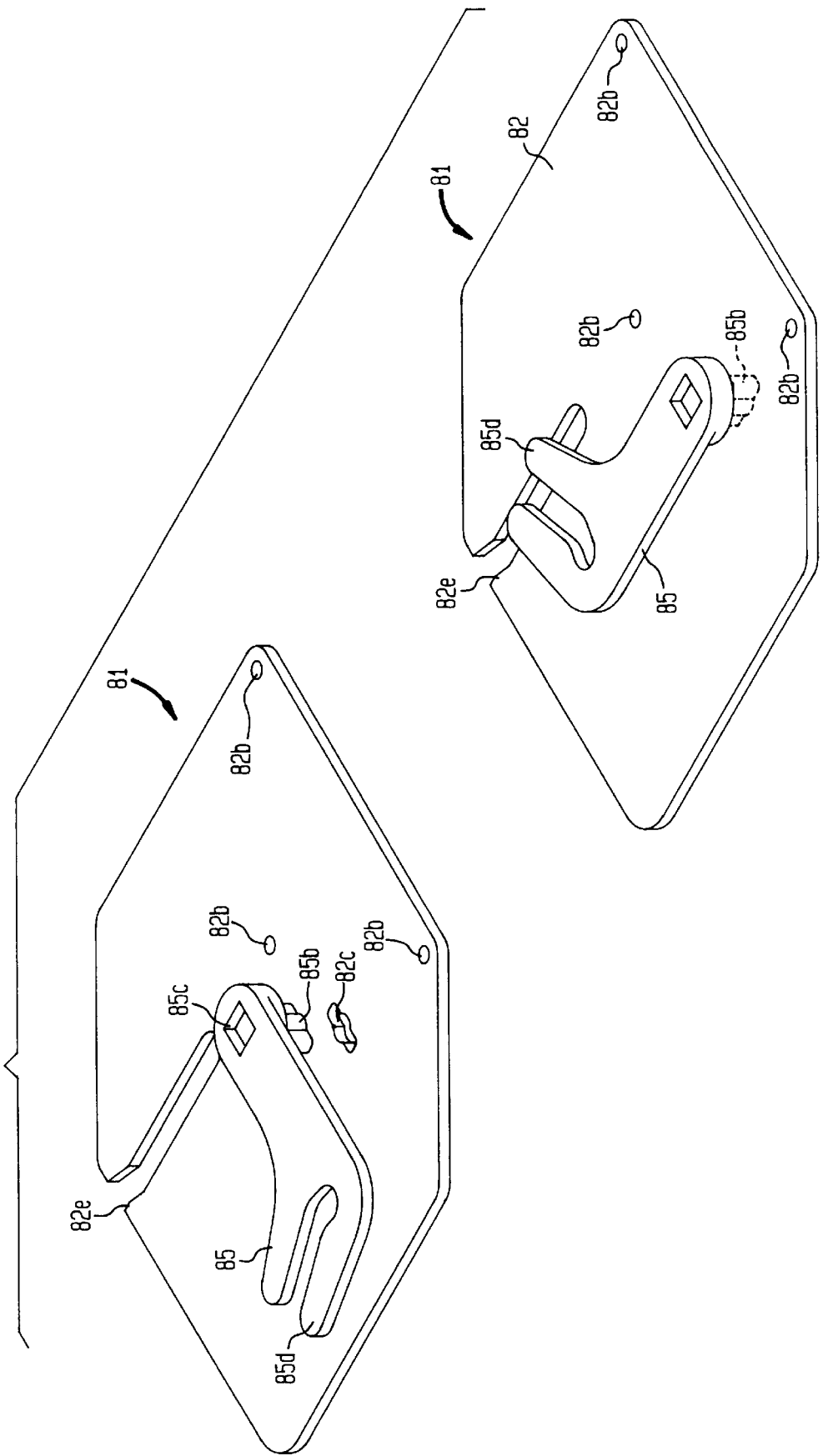

ically force the circuit breaker unit so that it is properly installed in, mounted on, secured to or otherwise associated with its corresponding plug-in unit. For larger size circuit breaker units, this becomes more difficult because of the increased difficulty in handling heavier and larger sized circuit breaker units, and because of the force that may be required to overcome the resistance of the connections between the circuit breaker unit and its corresponding plug-in unit.

CIRCUIT BREAKER DRAW APPARATUS AND SYSTEM WITH A SLIDER FLANGE ATTACHED TO THE ACTIVE DRAW BRACKET

FIELD OF THE INVENTION

This invention relates to a circuit breaker draw apparatus and system that interfaces between a circuit breaker unit and its mounting or plug-in unit or other circuit breaker connecting apparatus or means to facilitate alignment, installation and withdrawal (i.e., draw in and draw out) of the circuit breaker unit from its mounting or plug-in unit or other circuit breaker connecting apparatus or means.

BACKGROUND OF THE INVENTION

Certain industrial applications may require that a circuit breaker unit be more easily connected or disconnected from service to facilitate inspection, maintenance or replacement of the circuit breaker unit. In such applications, the circuit breaker unit may be plugged into or otherwise associated with a plug-in unit or other installation or mounting apparatus, device or mechanism that comprises connections for the circuit breaker units, as well as the field wiring. When installing the circuit breaker unit, an operator must lift the circuit breaker unit into its proper position so as to align the circuit breaker unit with the plug-in unit, and then physically force the circuit breaker unit so that it is properly installed in, mounted on, secured to or otherwise associated with its corresponding plug-in unit. For larger size circuit breaker units, this becomes more difficult because of the increased difficulty in handling heavier and larger sized circuit breaker units, and because of the force that may be required to overcome the resistance of the connections between the circuit breaker unit and its corresponding plug-in unit.

There are various different types of known circuit breaker drawout equipment for installing and removing circuit breaker units. These known devices are believed, however, to have certain disadvantages depending on the application. For example, certain known drawout equipment is believed to require two-handed operation to fully insert or install and remove or withdraw the circuit breaker unit.

Consequently, there is a need for a circuit breaker draw or movement apparatus and system that is relatively easy to use with circuit breaker assemblies having a circuit breaker unit and a plug-in unit or other circuit breaker connecting apparatus or means, especially insulated case circuit breaker assemblies. There is also a need for a circuit breaker draw or movement apparatus and system that allows the circuit breaker unit to be drawn in or inserted and removed, drawn out or otherwise withdrawn when the enclosure door is closed. In addition, there is also a need for a circuit breaker draw or movement apparatus and system that may be used either with three-pole or four-pole circuit breaker assemblies by simply selecting the appropriate length shaft. There is also a need for a circuit breaker draw or movement apparatus and system having a slide actuator or slider that eliminates the need for shoulder rivets. Finally, there is a need for a circuit breaker draw or movement apparatus and system having a lockout device that may be used with padlocks having shackle diameters ranging from three (3) to eight (8) millimeters.

SUMMARY OF THE INVENTION

It is an object of the present invention to overcome the limitations and problems of the known art.

It is another object of the present invention to provide a circuit breaker movement apparatus for use with a circuit breaker assembly, where the circuit breaker assembly has a circuit breaker unit that is adapted for connection to or disconnection from a circuit breaker connecting apparatus. The circuit breaker movement apparatus comprises a movement bracket assembly adapted for mounting to the circuit breaker connecting apparatus, a guide assembly adapted for mounting to the circuit breaker unit, and a drive assembly adapted for mounting to the bracket assembly and for causing the guide assembly to move with respect to the bracket assembly.

It is yet another object of the present invention to provide a circuit breaker movement apparatus for use with a circuit breaker assembly, where the circuit breaker assembly has a circuit breaker unit that may be connected to or disconnected from a circuit breaker connecting assembly. The circuit breaker movement apparatus comprises a movement bracket means for mounting to the circuit breaker connecting device, a guide means for mounting to the circuit breaker device, and a drive means for mounting to the movement bracket means and for causing the guide means to move with respect to the movement bracket means.

It is still another object of the present invention to provide a circuit breaker movement system for use with a circuit breaker assembly, where the circuit breaker assembly has a circuit breaker unit that is adapted for connection to or disconnection from a circuit breaker connecting apparatus. The circuit breaker movement system comprises at least one circuit breaker assembly, wherein the circuit breaker assembly comprises a circuit breaker unit and a circuit breaker connecting apparatus, a movement bracket assembly adapted for mounting to the circuit breaker connecting apparatus, a guide assembly adapted for mounting to the circuit breaker unit, and a drive assembly adapted for mounting to the bracket assembly and for causing the guide assembly and the circuit breaker unit to move with respect to the bracket assembly and the circuit breaker connecting apparatus.

It is yet another object of the present invention to provide a circuit breaker movement system for use with a circuit breaker assembly, where the circuit breaker assembly has a circuit breaker unit that is adapted for connection to or disconnection from a circuit breaker connecting apparatus. The circuit breaker movement system comprises at least one circuit breaker means, wherein the circuit breaker assembly comprises a circuit breaker unit and a circuit breaker connecting means, wherein the circuit breaker connecting means is for connecting the circuit breaker unit to or disconnecting the circuit breaker unit from the circuit breaker connecting means, a movement bracket means for mounting to the circuit breaker connecting means, a guide means adapted for mounting to the circuit breaker unit, and a drive means adapted for mounting to the movement bracket means and for causing the guide means and the circuit breaker unit to move with respect to the movement bracket means and the circuit breaker connecting means.

These and other objects, advantages and features of the present invention will be readily understood and appreciated with reference to the detailed description of preferred embodiments discussed below together with the accompanying drawings.

BRIEF DESCRIPTION OF THE DRAWINGS

FIG. 4B details the components of the passive draw bracket assembly.

FIG. 4C details the way in which a draw arm is assembled or connected together with a draw bracket.

DETAILED DESCRIPTION OF THE PREFERRED EMBODIMENT

Figure 1:
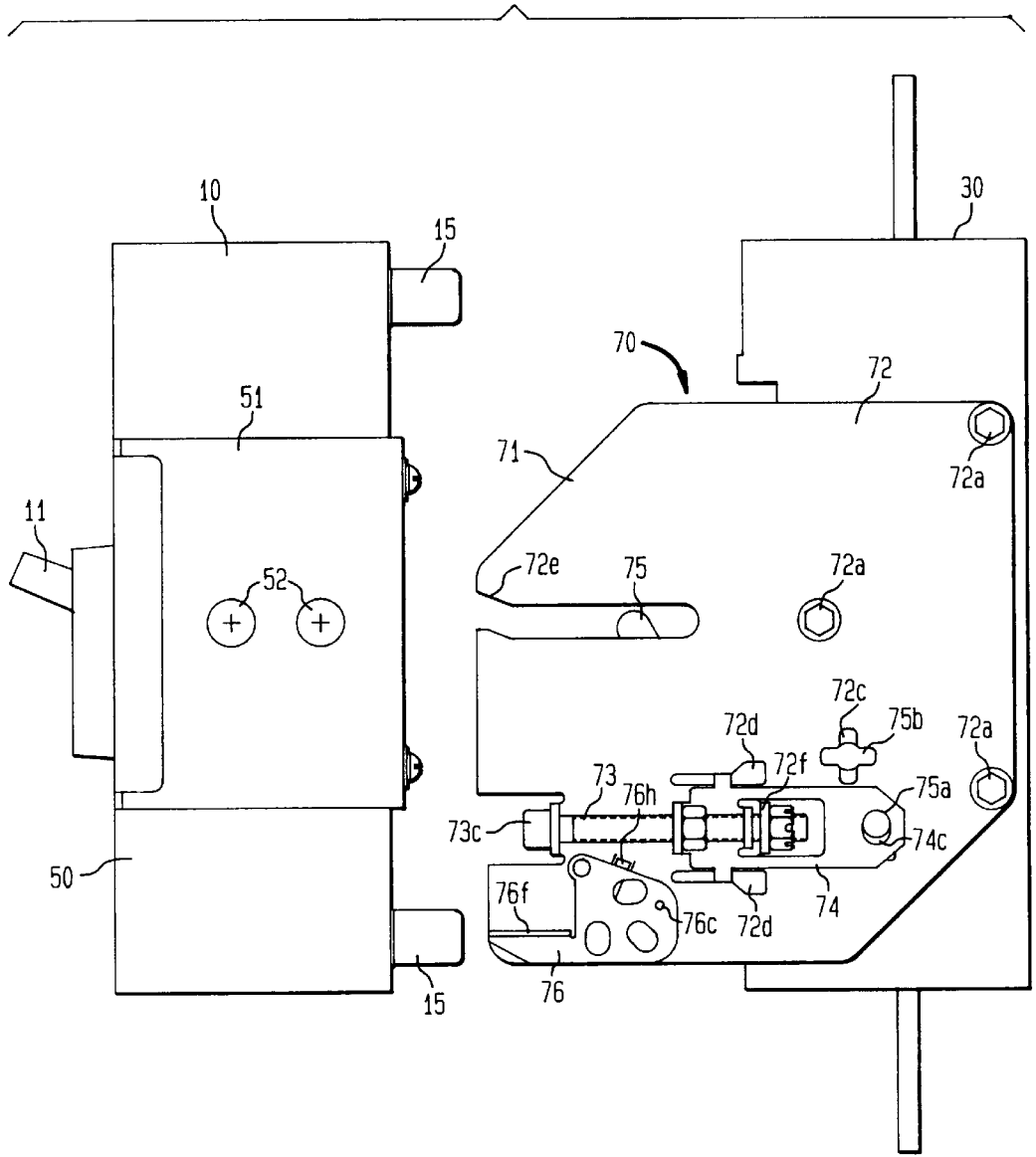
FIG. 1 is a side-view drawing of an embodiment of the circuit breaker draw system of the present invention in a free position.

Referring to FIGS. 1 to 7, the circuit breaker draw assembly 1 comprises a circuit breaker guide bracket assembly 50 and a circuit breaker draw bracket assembly 70. The circuit breaker guide bracket assembly 50 comprises right-hand and left-hand circuit breaker guide brackets 51 and 61, which are preferably made of steel but which may also be made from any other suitably appropriate material. The circuit breaker guide brackets 51 and 61 are attached to, fastened to, mounted on, secured to or otherwise associated with the right and left sides 11a and 12a and backsides 11b and 12b of circuit breaker unit 10 by using threaded screws and washers 51a, 51b, 61a and 61b and by fitting hooked ends 51c and 61c into circuit breaker unit lips 10c and 10d, which are integrally formed in the circuit breaker unit 10. The circuit breaker guide brackets 51 and 61 are used to engage the draw bracket assembly 70. Each circuit breaker bracket 51 and 61 has a pair of guide posts 52 and 62, respectively, which are attached to each breaker guide bracket 51 and 61 using rivets 52c and 62c, respectively. The guide posts 52 and 62 are used to guide and support the circuit breaker unit 10 in the draw bracket assembly 70. The guide posts 52 and 62 are also used to engage a pair of draw-arms 75 and 85 of the draw bracket assembly 70.

The circuit breaker unit 10 comprises toggle handle 11, circuit breaker lug openings or apertures and circuit breaker mounting openings or apertures. Threaded copper studs 15 are passed through circuit breaker mounting openings or apertures and are received by tulip contacts 35 in the plug-in unit 30 so as to connect or mount the circuit breaker unit 10 to the plug-in unit 30. In this way, a current path may be provided through the plug-in unit 30 to the circuit breaker unit 10.

Figure 2:
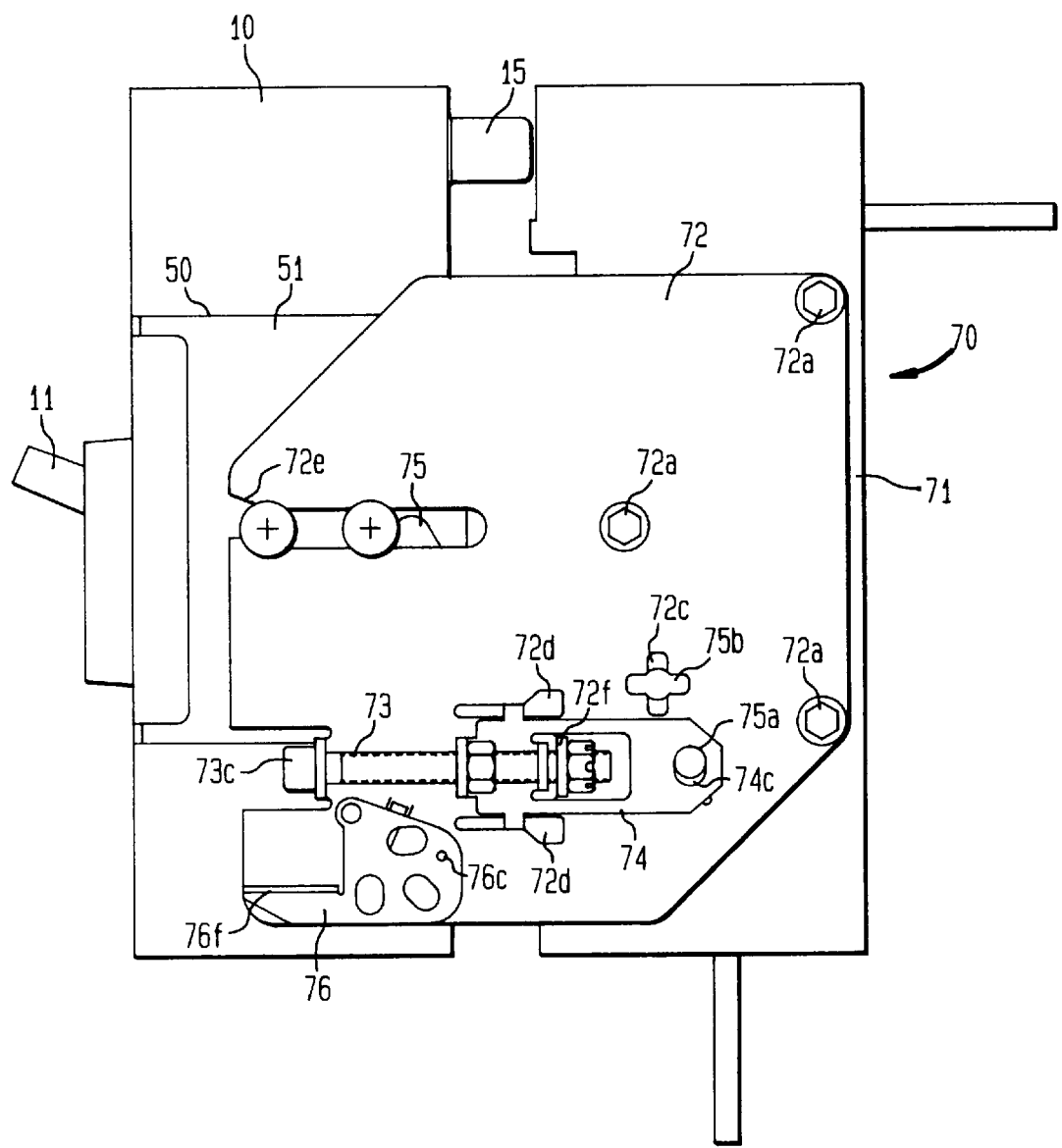
FIG. 2 is a side-view drawing of an embodiment of the circuit breaker draw system of the present invention in an open position.
Figure 3:
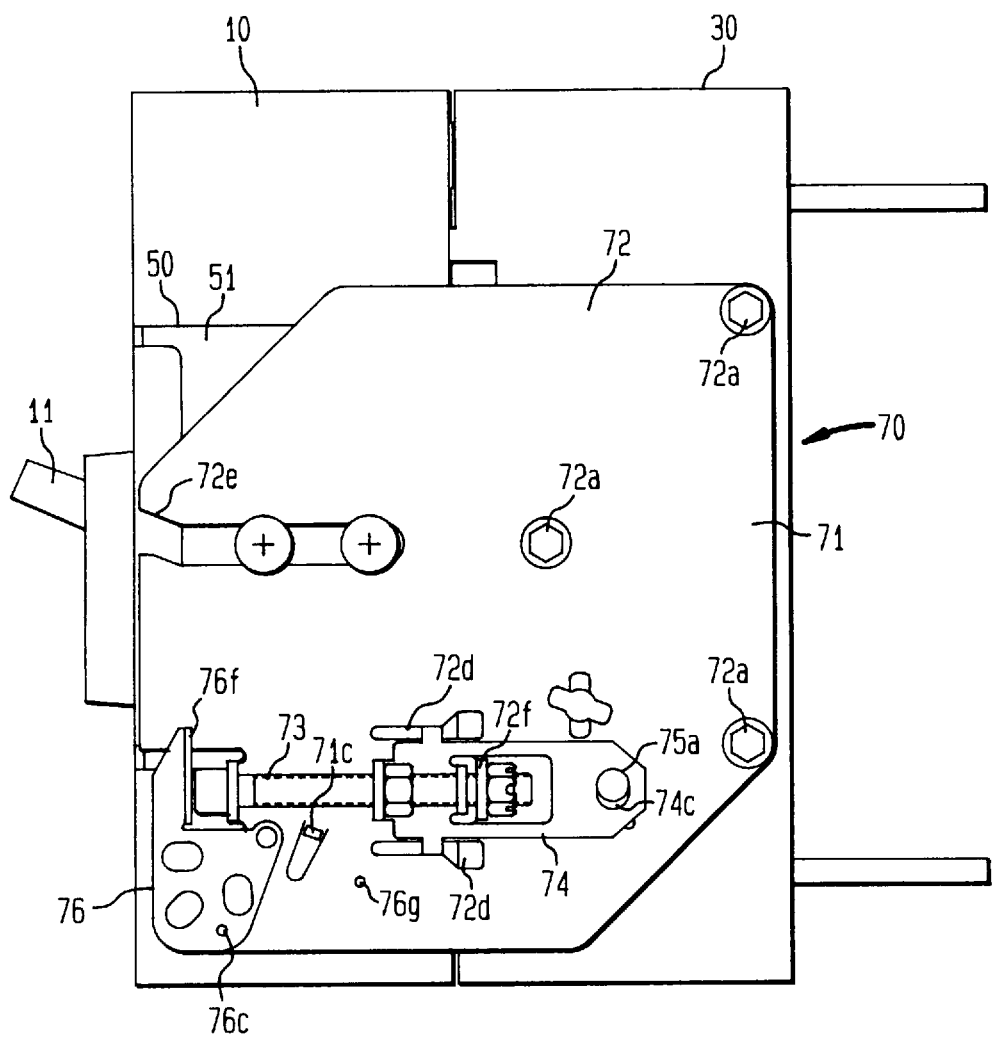
FIG. 3 is a side-view drawing of an embodiment of the circuit breaker draw system of the present invention in a closed position.

Referring to FIGS. 1 to 3, the circuit breaker draw assembly 1 comprises a draw bracket assembly 70 that further comprises a pair of draw bracket assemblies 71 and 81. Each draw bracket assembly 71 and 81 comprises draw brackets 72 and 82, respectively, that are attached to, secured to or otherwise associated with the left and right-hand side of the plug-in unit 30 by using bolts and nuts 72a and 82a, which are inserted through draw bracket apertures or openings 72b and 82b, respectively. The draw brackets 72 and 82 provide support for the circuit breaker unit 10 together with the circuit breaker guide brackets 51 and 61 having guide posts 52 and 62, respectively. Drive screw 73, slide actuator or slider 74, draw arms 75 and 85 and padlock bracket 76 are attached to, mounted to or otherwise associated with active draw bracket 72. Passive draw arm 85 attaches to or is otherwise associated with passive draw bracket 82.

Figure 4A:
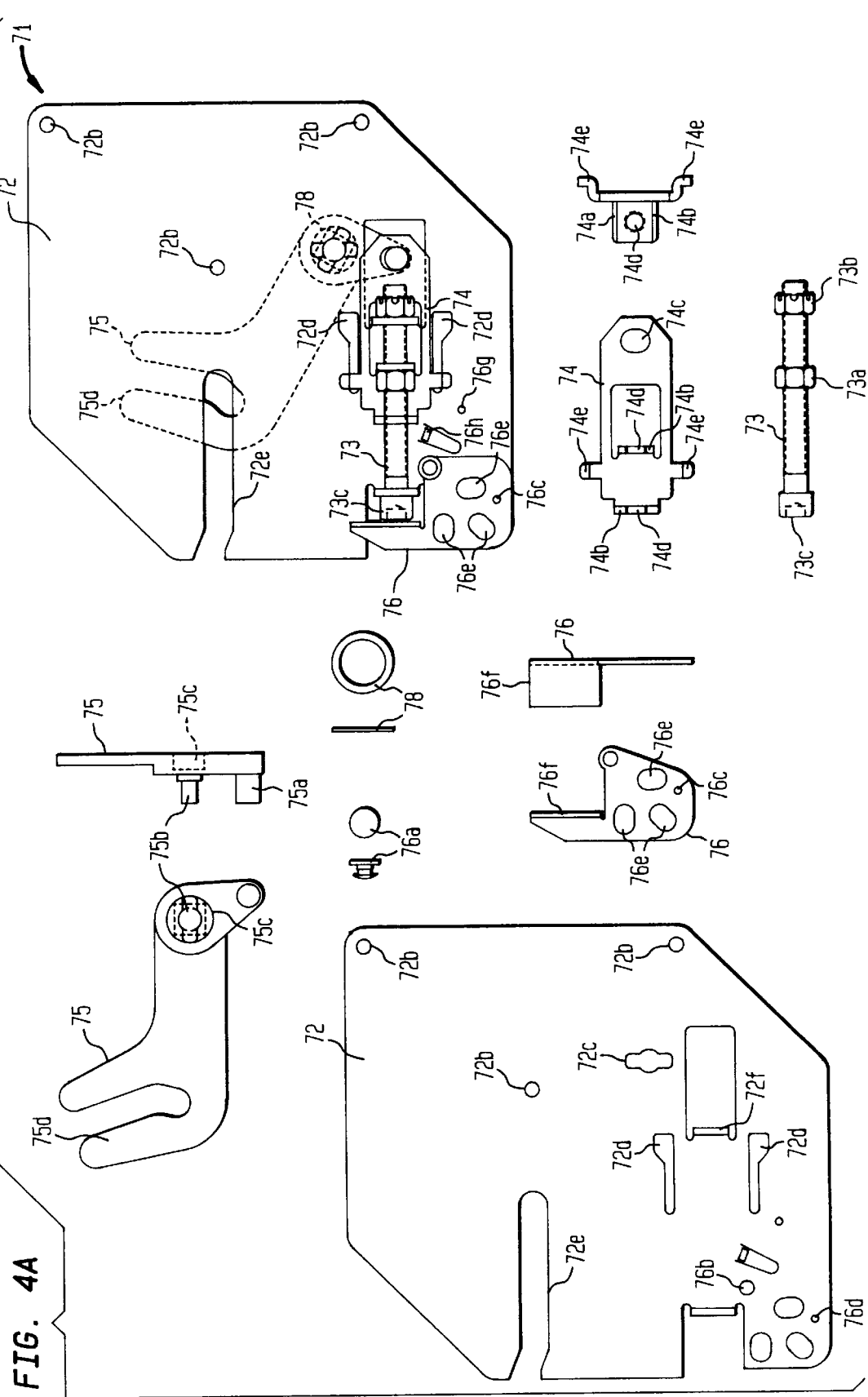
FIG. 4A details the components of the active draw bracket assembly.
Figure 5:
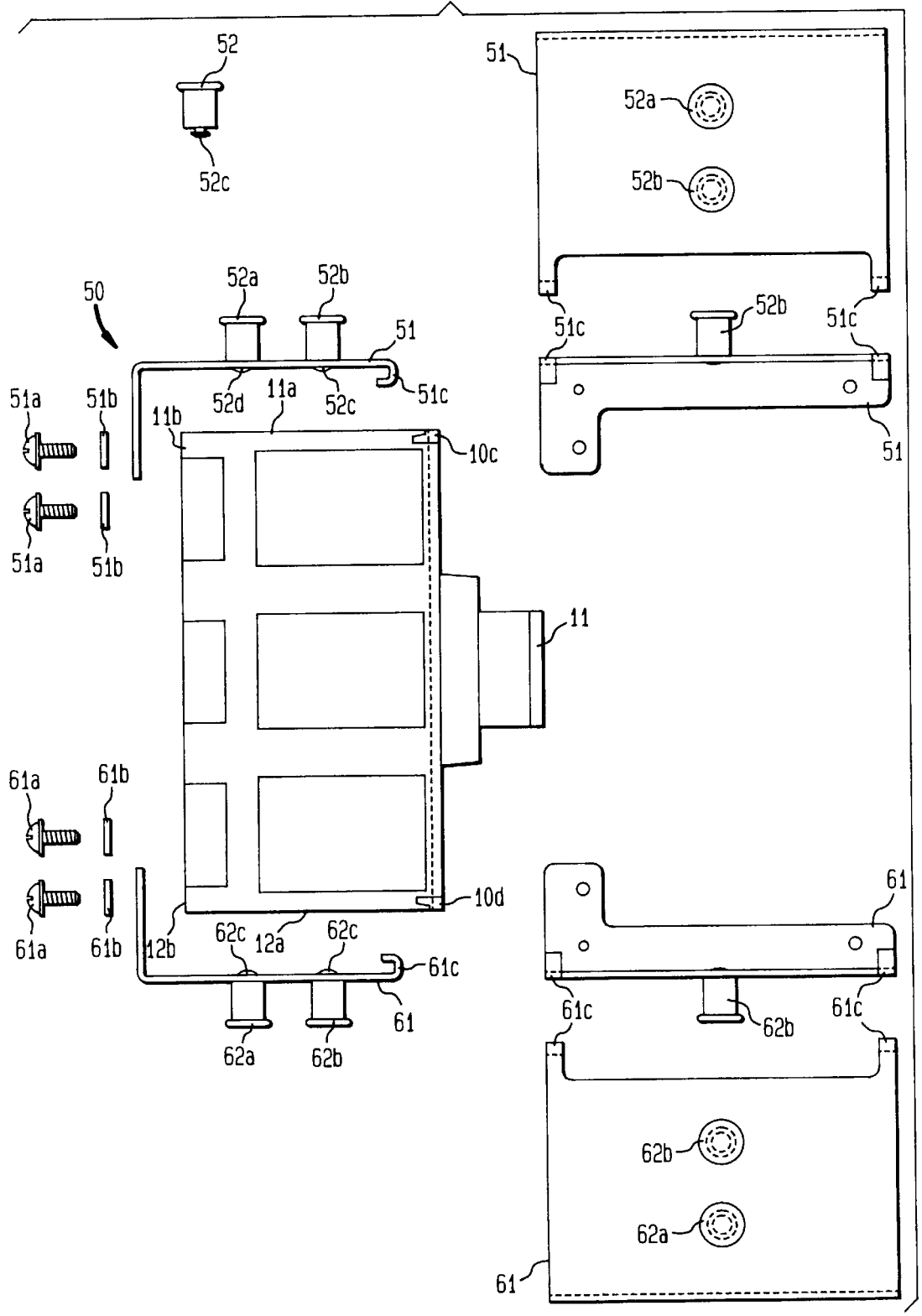
FIG. 5 details top, front, side and top views of the circuit breaker guide post assembly.
Figure 6:
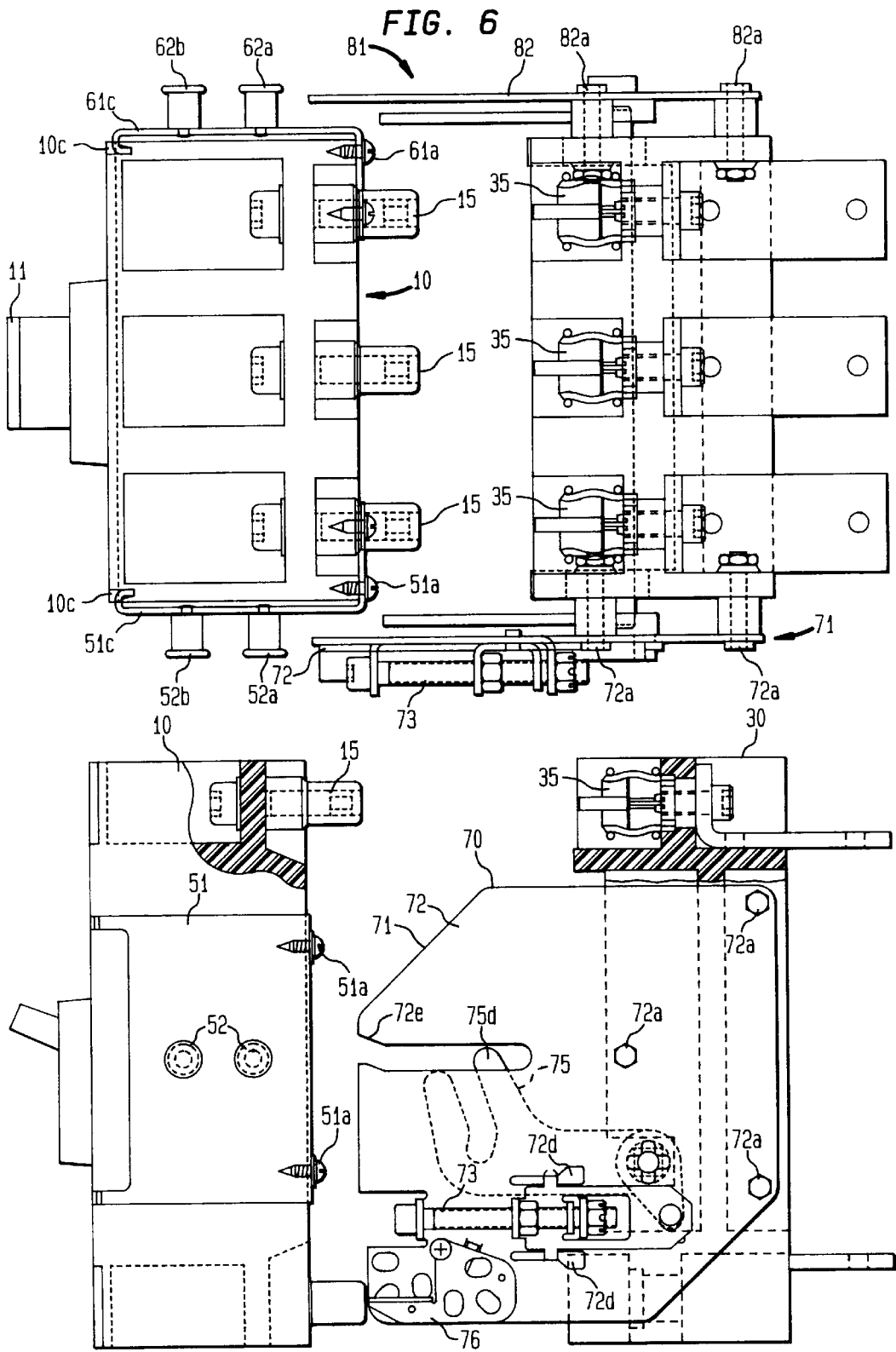
FIG. 6 details the side and top views of the circuit breaker unit with the circuit breaker guide post assembly and of the plug-in unit with the active and passive draw bracket assemblies.
Figure 7:
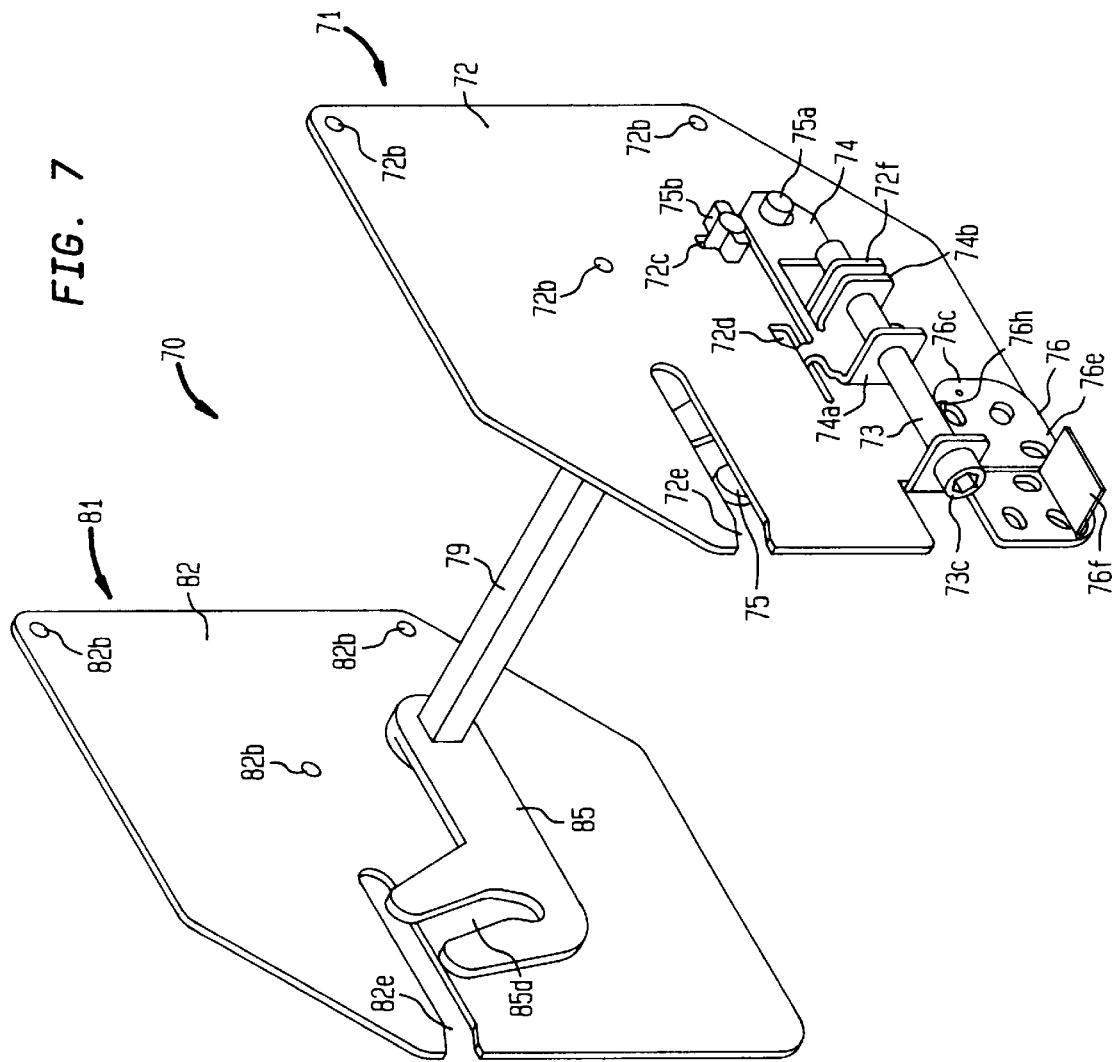
FIG. 7 is a three-dimensional view of the draw bracket assembly comprising the active and passive draw bracket assemblies.

Referring to FIG. 4A, hex drive screw 73, which is preferably made from steel but which may also be made from any other suitably appropriate material, threads into slider 74 through slider apertures or openings 74d in slider flanges 74a and 74b and also through an aperture or opening in a draw bracket flange 72f of draw bracket 72. The drive screw 73 uses a prevailing torque nut 73a to limit the travel distance of the draw arms 75 and 85. This is done by limiting the motion of the slider 74 when the circuit breaker unit 10 is being inserted into the plug-in unit 30. To limit travel of the draw arms 75 and 85 when the circuit breaker unit 10 is being removed, drawn out or otherwise withdrawn, a slotted nut 73b and associated cotterpin are used to limit motion of the slider 74. The slider 74, which is preferably made from steel but which may also be made from any other suitably appropriate material, attaches to active draw bracket 71 by inserting slider flanges 74e in draw bracket apertures or openings 72d. The draw bracket apertures or openings 72d are believed to allow for easier assembly and to eliminate the need for extra assembly operations or shoulder rivets. The slider 74 also engages active draw out arm 75. In particular, as the drive screw 73 rotates, the slider 74 is displaced so as to rotate active draw arm 75.

Referring to FIGS. 4A, 4B and 4C, the active draw arm 75 and passive draw arm 85 are detailed. The draw arms 75 and 85 are preferably made from aluminum-bronze castings, but may also be made from any other suitably appropriate material. The draw arms 75 and 85 are attached to draw brackets 72 and 82, respectively, using transfer shaft 79. Attachment head apertures or openings 72c and 82c in draw brackets 72 and 82, respectively, allow the transfer shaft 79 to be aligned during assembly. The transfer shaft 79 is inserted in draw arm apertures 75c and 85c. Each attachment head 75b and 85b is inserted in apertures or openings 72c and 82c and rotated or turned. It is believed that this eliminates need for more costly hardware and assembly operations.

During normal operations, the draw arms 75 and 85 cannot be rotated to a position that aligns with attachment head apertures or openings 72c and 82c. Wave spring washers 78 and 88 are used to apply some force between the draw arms 75 and 85 and draw brackets 72 and 82, respectively. As discussed, square openings or apertures 75c and 85c are provided in draw arms 75 and 85 so that transfer shaft 79 may be inserted therein. Active draw arm 75 also has a post 75a that is inserted through the oval-shaped aperture or opening 74c in the slider 74. In this way, as the slider 74 is displaced, the draw arms 75 and 85 may rotate.

Again referring to FIG. 4A, a padlock bracket 76, which is preferably made from steel but which may also be made from any other suitably appropriate material, attaches to active draw bracket 72 using shoulder rivet 76a. Small dimple 76c in the padlock bracket 76 and a small aperture or opening 76d in draw bracket 72 are used to align the apertures or openings 76e in draw bracket 72 for finding the lock position. Similarly, small dimple 76c and a small aperture 76g in draw bracket 72 are used to find the unlocked or stored padlock bracket position. When the padlock bracket 76 is rotated clockwise into the lock position so as to cover the hex drive 73c of the drive screw 73, the three draw bracket oval-shaped apertures or openings 76e are aligned with corresponding apertures in the draw bracket 72, and up to three padlocks (not shown) may be inserted to prevent access to the drive screw 73. The hex drive head 73c may be adapted for alien wrenches, standard screwdrivers or phillips head screwdrivers or any other suitably appropriate way in which the drive head 73c may be rotated. Padlocks having shackle diameters ranging from three (3) to eight (8) millimeters may be used.

The circuit breaker draw apparatus and assembly operates in the following way: Referring to FIG. 1, the circuit breaker unit 10 is aligned with the draw bracket assembly 70. Next, the circuit breaker unit 10 is guided into the slots 72e and 82e of the draw brackets 72 and 82 until the guide posts 52 and 62 are resting in their free position in the draw bracket slot apertures or openings 72e and 82e. To insert or draw the circuit breaker unit 10 into the plug-in unit 30 so as to connect the circuit breaker unit 10, the drive screw 73 is rotated or turned clockwise using the hex drive head 73c. Rotating the drive screw 73 displaces the slider 74 so as to rotate or turn draw arms 75 and 85. As discussed, the draw arms 75 and 85 are secured to or otherwise associated with the square-shaped transfer shaft 79. Referring to FIG. 2, as the draw arms 75 and 85 rotate, they capture the two forward guide posts 52a and 62a in the two draw bracket slots 72c and 82c, and thereby draw or pull in the circuit breaker unit 10 forwardly so as to cause its threaded copper studs 15 to be inserted or drawn into the copper tulip contacts 35 of the plug-in unit 30.

As discussed, when inserting or drawing in the circuit breaker unit 10, the amount that the draw arms 75 and 85 may travel is limited by the prevailing torque nut 73a that is threaded onto the body of the drive screw 73, which limits displacement of the slider 74. In FIG. 3, the circuit breaker unit 10 and plug-in unit 30 are shown in their fully closed position.

To remove, draw out or otherwise withdraw the circuit breaker unit 10 from the plug-in unit 30 so as to disconnect the circuit breaker unit 10, the hex drive head 73c is rotated counter-clockwise so as to cause the hex drive screw 73 to rotate and cause the slider 74 to travel rearwardly or outwardly from the draw brackets 72 and 82. This causes the draw arms 75 and 85 to rotate counter-clockwise. This action draws out or withdraws and disconnects the circuit breaker unit 10 from its plug-in unit 30. When drawing out or withdrawing the circuit breaker unit 10, the distance that the draw arms 75 and 85 travel is limited by the slotted nut 73b that is threaded into the end of the drive screw 73, which limits the amount that the slider 74 may be displaced or otherwise travel. To limit access to the drive screw 73, the padlock bracket 76 may be rotated or turned clockwise until the padlock bracket flange or tab 76f covers the hex drive head 73c. Padlocks having shackle diameters ranging from three (3) to eight (8) millimeters may be used to prevent a circuit breaker unit 10 from being insertedly connected to or withdrawn from its plug-in unit 30.

While the present invention has been described in connection with what are the most practical and preferred embodiments as currently contemplated, it should be understood that the present invention is not limited to the disclosed embodiments. Accordingly, the present invention is intended to cover various modifications and equivalent arrangements, methods and structures that are within the spirit and scope of the claims.

What is claimed is:

1. A circuit breaker movement apparatus for use with a circuit breaker assembly, where the circuit breaker assembly has a circuit breaker unit that may be connected or disconnected from a circuit breaker connecting apparatus, comprising:

a movement bracket assembly for mounting to the circuit breaker connecting apparatus;

a guide assembly for mounting to the circuit breaker unit; and a drive assembly for mounting to said bracket assembly that causes said guide assembly to move with respect to said bracket assembly, wherein said drive assembly is mounted to the movement bracket assembly by inserting at least one slider flange in at least one draw bracket aperture.

2. The circuit breaker movement apparatus defined by claim 1, wherein said movement bracket assembly comprises an arm assembly for use with said guide assembly.

3. The circuit breaker movement apparatus defined by claim 1, wherein said drive assembly is a hex drive assembly.

4. The circuit breaker movement apparatus defined by claim 1, wherein said movement bracket assembly comprises two movement brackets, and wherein said guide assembly comprises two guide brackets.

5. The circuit breaker movement apparatus defined by claim 4, wherein said two movement brackets are connected by a shaft assembly.

6. A circuit breaker movement for use with a circuit breaker assembly, where the circuit breaker assembly has a circuit breaker unit that may be connected to or disconnected from a circuit breaker connecting assembly, comprising:

a movement bracket means for mounting to the circuit breaker connecting device;

a guide means for mounting to the circuit breaker device; and a drive means for mounting to said movement bracket means and for causing said guide means to move with respect to said movement bracket means, wherein said drive means is mounted to the movement bracket means by inserting at least one slider flange in at least one draw bracket means aperture.

7. The circuit breaker movement apparatus defined by claim 6, wherein said movement bracket means comprises an arm means for interfacing with said guide means.

8. The circuit breaker movement apparatus defined by claim 6, wherein said drive means is a hex drive means.

9. The circuit breaker movement apparatus defined by claim 6, wherein said movement bracket means comprises two movement brackets, and wherein said guide means comprises two guide brackets.

10. The circuit breaker movement apparatus defined by claim 9, wherein said two movement brackets are connected by a shaft means.

11. A circuit breaker movement system for use with a circuit breaker assembly, where the circuit breaker assembly has a circuit breaker unit that may be connected to or disconnected from a circuit breaker connecting apparatus, comprising:

at least one circuit breaker assembly, wherein said circuit breaker assembly comprises a circuit breaker unit and a circuit breaker connecting apparatus;

a movement bracket assembly for mounting to said circuit breaker connecting apparatus;

a guide assembly for mounting to said circuit breaker unit; and a drive assembly for mounting to said bracket assembly and for causing said guide assembly and said circuit breaker unit to move with respect to said bracket assembly and said circuit breaker connecting apparatus, wherein said drive assembly is mounted to the movement bracket assembly by inserting at least one slider flange in at least one movement bracket aperture.

12. The circuit breaker movement system defined by claim 11, wherein said movement bracket assembly comprises an arm assembly for use with said guide assembly.

13. The circuit breaker movement system defined by claim 11, wherein said drive assembly is a hex drive assembly.

14. The circuit breaker movement system defined by claim 11, wherein said movement bracket assembly comprises two movement brackets, and wherein said guide assembly comprises two guide brackets.

15. The circuit breaker movement system defined by claim 14, wherein said two movement brackets are connected by a shaft assembly.

16. A circuit breaker movement system for use with a circuit breaker assembly, where the circuit breaker assembly has a circuit breaker unit that may be connected to or disconnected from a circuit breaker connecting apparatus, comprising:

at least one circuit breaker means, wherein said circuit breaker assembly comprises a circuit breaker unit and a circuit breaker connecting means, wherein said circuit breaker connecting means is for connecting said circuit breaker unit to or disconnecting said circuit breaker unit from said circuit breaker connecting means;

a movement bracket means for mounting to said circuit breaker connecting means;

a guide means for mounting to said circuit breaker unit; and a drive means for mounting to said movement bracket means and for causing said guide means and said circuit breaker unit to move with respect to said movement bracket means and said circuit breaker connecting means, wherein said drive assembly is mounted to the movement bracket means by inserting at least one slider flange in at least one movement bracket means aperture.

17. The circuit breaker movement apparatus defined by claim 16, wherein said movement bracket means comprises an arm means for interfacing with said guide means.

18. The circuit breaker movement apparatus defined by claim 16, wherein said drive means is a hex drive means.

19. The circuit breaker movement apparatus defined by claim 16, wherein said movement bracket means comprises two movement brackets, and wherein said guide means comprises two guide brackets.

20. The circuit breaker movement apparatus defined by claim 19, wherein said two movement brackets are connected by a shaft means.

21. The circuit breaker movement apparatus defined by claim 1, further comprising a securing assembly that attaches to the movement bracket assembly and which is positioned so as to cover at least one end of the drive assembly so as to limit operation of the drive assembly.

22. The circuit breaker movement apparatus defined by claim 1, wherein the securing assembly is a padlock bracket, having at least one aperture for receiving a padlock, and which is pivotally attached to the movement bracket assembly so that it is rotated so as to limit operation of the drive assembly.

23. The circuit breaker movement apparatus defined by claim 6, further comprising a securing means for attaching to the movement bracket means and for positioning so as to cover at least one end of the drive means so as to limit operation of the drive means.

24. The circuit breaker movement apparatus defined by claim 23, wherein the securing means is a padlock bracket means, having at least one aperture for receiving a padlock, for pivotally attaching to the movement bracket means so that it is rotated so as to limit operation of the drive means.

25. The circuit breaker movement system defined by claim 11, further comprising a securing assembly that attaches to the movement bracket assembly and which is positioned so as to cover at least one end of the drive assembly so as to limit operation of the drive assembly.

26. The circuit breaker movement apparatus defined by claim 25, wherein the securing assembly is a padlock bracket, having at least one aperture for receiving a padlock, and which is pivotally attached to the movement bracket assembly so that it is rotated so as to limit operation of the drive assembly.

27. The circuit breaker movement system defined by claim 16, further comprising a securing assembly that attaches to the movement bracket assembly and which is positioned so as to cover at least one end of the drive assembly so as to limit operation of the drive assembly.

28. The circuit breaker movement apparatus defined by claim 27, wherein the securing assembly is a padlock bracket, having at least one aperture for receiving a padlock, and which is pivotally attached to the movement bracket assembly so that it is rotated so as to limit operation of the drive assembly.

* * * * *